US010365099B2

United States Patent
Noh et al.

(10) Patent No.: US 10,365,099 B2
(45) Date of Patent: Jul. 30, 2019

(54) INSTALLATION SPACE EXPLORATION METHOD FOR A SUBSTANCE AND READABLE MEDIA HAVING THE PROGRAM THEREFOR

(71) Applicant: GWANGJU INSTITUTE OF SCIENCE AND TECHNOLOGY, Gwangju (KR)

(72) Inventors: Kyoung-Seok Noh, Gwangju (KR); Yong-Gu Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 0 days.

(21) Appl. No.: 15/335,716

(22) Filed: Oct. 27, 2016

(65) Prior Publication Data

US 2017/0116782 A1   Apr. 27, 2017

(30) Foreign Application Priority Data

Oct. 27, 2015   (KR) .......................... 10-2015-0149187

(51) Int. Cl.
*G01C 15/00* (2006.01)
*G06K 9/00* (2006.01)
*G01B 11/24* (2006.01)
*G01F 17/00* (2006.01)

(52) U.S. Cl.
CPC .............. *G01C 15/00* (2013.01); *G01B 11/24* (2013.01); *G01F 17/00* (2013.01); *G06K 9/00805* (2013.01); *G01B 2210/52* (2013.01); *G06T 2200/04* (2013.01); *G06T 2207/10024* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 2010/0091300 A1* | 4/2010 | Thomaschewski .... | G01B 11/24 356/601 |
| 2013/0170744 A1* | 7/2013 | Hwang .............. | G06K 9/00214 382/165 |
| 2015/0210564 A1* | 7/2015 | Inoue ...................... | C02F 1/325 250/438 |
| 2016/0176724 A1* | 6/2016 | Ji .......................... | G06Q 10/06 700/282 |

OTHER PUBLICATIONS

Turner, Eric, and Avideh Zakhor. "Watertight planar surface meshing of indoor point-clouds with voxel carving." 3DTV-Conference, 2013 International Conference on. IEEE, 2013. 11 pages.*

(Continued)

*Primary Examiner* — Ryan P Potts
(74) *Attorney, Agent, or Firm* — Hauptman Ham, LLP

(57) ABSTRACT

A method for exploring an installation space of an article includes acquiring a point cloud of an indoor space including a number of point data with three-dimensional scanning. The method also includes acquiring obstacle data and passage data from the point cloud. The method further includes exploring an installation space of the article to determine a space where an obstacle is placed in the obstacle data and a space where a passage is present, as a space where the article is allowed to be installed.

9 Claims, 8 Drawing Sheets

(56) References Cited

OTHER PUBLICATIONS

Watanabe, Yusuke. "Increasing speed of Ship Repair through Three-Dimensional Laser Measurement in Compliance with Environmental Regulations." Mitsubishi Heavy Industries Technical Review, Volu. 50, No. 2, Jun. 2013. 4 pages.*

"28 Ships Scanned so Far." ARGO NAVIS Marine Consulting & Engineering | Press , May 12, 2015, argonavis.gr/newsarticle-1w.html. 9 pages.*

Holenstein, Claude, Robert Zlot, and Michael Bosse. "Watertight surface reconstruction of caves from 3D laser data." Intelligent Robots and Systems (IROS), 2011 IEEE/RSJ International Conference on. IEEE, 2011. 8 pages.*

* cited by examiner

INSTALLATION SPACE EXPLORATION METHOD FOR A SUBSTANCE AND READABLE MEDIA HAVING THE PROGRAM THEREFOR

CROSS REFERENCE TO RELATED APPLICATION

This application claims the benefit of Korean Patent Application No. 10-2015-0149187, filed on Oct. 27, 2015, entitled "INSTALLATION SPACE EXPLORATION METHOD FOR A SUBSTANCE AND READABLE MEDIA HAVING THE PROGRAM THEREFOR", which is hereby incorporated by reference in its entirety into this application.

BACKGROUND

1. Technical Field

The present invention relates to a method for exploring an installation space of an article and a computer-readable recording medium storing a program therefor. More specifically, an exemplary embodiment of the present invention relates to a method for exploring an internal space in a ship where a ballast water management system (BWMS) is allowed to be installed, and a computer-readable recording medium storing a program for the same.

2. Description of the Related Art

Ballast water refers to water stored in a ship in order to increase the safety of operation of the ship. The ballast water is charged in the ship at a departure and is discharged out of the ship at a destination after remote movement. For example, sea water may be charged in a ship at an A point (for example, a Portland harbor in U.S.A,) and may be discharged out of the ship at a B point (for example, an Incheon harbor in Korea). However, while the sea water is being moved from the A point to the B point, marine life is moved with together the sea water, which may be the main cause of disturbance and destruction of the environments.

This problem forces new ships under recent construction to be equipped with a ballast water management system (BWMS). The BWMS may generally refer to an apparatuses for purifying sea water (ballast water) introduced into a ship in order to remove marine life from the ballast water. Mandatory installation of the BWMS in new ship under construction is increasing. However, many old ships have no BWMS. Therefore, there is an increasing case where a ship with no BWMS is not allowed to pass through sea or anchored in harbors of nations in which the BWMS is mandatory. Provided that a ship's lifetime is about 30 years, a ship whose service life remains a lot is not available for international trades through sea if it employs no BWMS. Accordingly, there is an increasing case where ships already constructed should employ the BWMS.

In order to newly install a BWMS in a ship with no BWMS, there is a method for a worker to first grasp candidate spaces where the BWMS may be installed, through a design drawing of the ship, and then identify and find a proper installation space where the BWMS is to be installed, by naked eyes, among the grasped candidate spaces. However, in many cases, this method cannot properly cope with a change in the design drawing. In addition, since a highly-skilled worker has to check the candidate spaces, this method is an expensive and time-consuming task. Thus, since the new BWMS installation is time-consuming, there is a problem that the operation time of the ship is reduced as much, which may result in reduction in a profit from the operation of the ship.

BRIEF SUMMARY

It is an aspect of the present invention to provide a method for exploring an internal space in a ship where a ballast water management system (BWMS) is allowed to be installed, which is capable of allowing an unskilled worker to grasp and find a BWMS installation space simply, quickly and correctly.

In accordance with one aspect of the present invention, there is provided a method for exploring an installation space of an article, including: acquiring a point cloud of an indoor space including a number of point data with three-dimensional scanning; acquiring obstacle data and passage data from the point cloud; and exploring an installation space of the article to determine a space where an obstacle is placed in the obstacle data and a space where a passage is present, as a space where the article is allowed to be installed.

According to the present invention, it is possible to allow anyone to find a BWMS installation space quickly, correctly and inexpensively.

DETAILED DESCRIPTION

Hereinafter, embodiments of the present invention will be described in detail with reference to the accompanying drawings. It should be understood that the present invention is not limited to the following embodiments, and that the embodiments are provided for illustrative purposes only. In addition, it should be understood by those skilled in the art that various changes in form and details may be made without departing from the spirit and scope of the present invention. The scope of the invention should be defined only by the accompanying claims and equivalents thereof.

In the following embodiments, a computer may refer to all automated systems which include at least a processor, preferably, a storage device, an input device and an output device and execute a program according to an external input such as an instruction and data to supply useful information to users.

The following description will be mainly given to a case of grasping and finding a space where a BWMS is allowed to be installed, from an internal space of a ship in which may systems have already been installed. However, the present invention is not limited thereto but may be applied to other cases of grasping and finding a space where a new object or article is allowed to be installed, from a space where other objects or articles have already been installed. However, the present invention has higher applicability to an established ship in which a BWMS is to be installed, as will be described below.

<First Embodiment>

Figure 1:
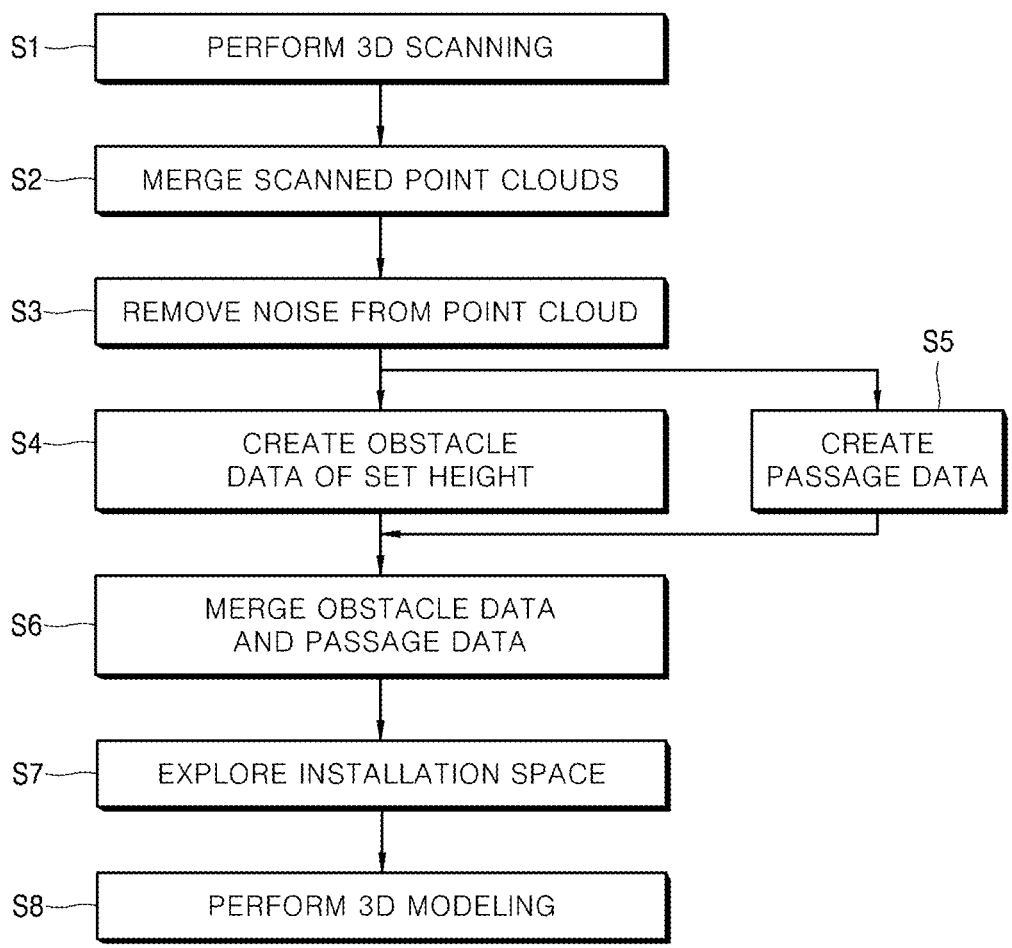
FIG. 1 is a flow chart for explaining a method for exploring a space where an article is to be installed, according to a first embodiment.

FIG. 1 is a flow chart for explaining a method for exploring a space where an article is to be installed, according to a first embodiment.

Referring to FIG. 1, three-dimensional (3D) scanning is performed for an internal space (S1). The 3D scanning refers generally to acquire shape information of an object by irradiating the object with light using a 3D scanner such as a laser or the like and convert the acquired shape information into digital information.

This 3D scanning technique may be used to easily acquire shape information of giant objects such as aircrafts, ships, buildings, bridges, geographical features, etc., as well as subminiature objects such as bolts and nuts. Conventionally, the 3D scanning has been mainly used to measure the shape of an object. However, in this embodiment, the 3D scanning is characterized by being used to grasp an object installed in an indoor space having predetermined boundary information.

The 3D scanning may be performed for one indoor space at plural positions. For example, if an indoor space is complicated and contains many obstacles, the 3D scanning may be performed at different positions and data such as images obtained by the 3D scanning may be merged later. In this case, each of point clouds acquired from a 3D scanner may consist of a point, which is represented by a (x, y, z) coordinate, and an angle. In order to acquire correct information on the space, measurement may be made while varying the position of the 3D scanner so as to minimize an unscanned space.

Figure 2:
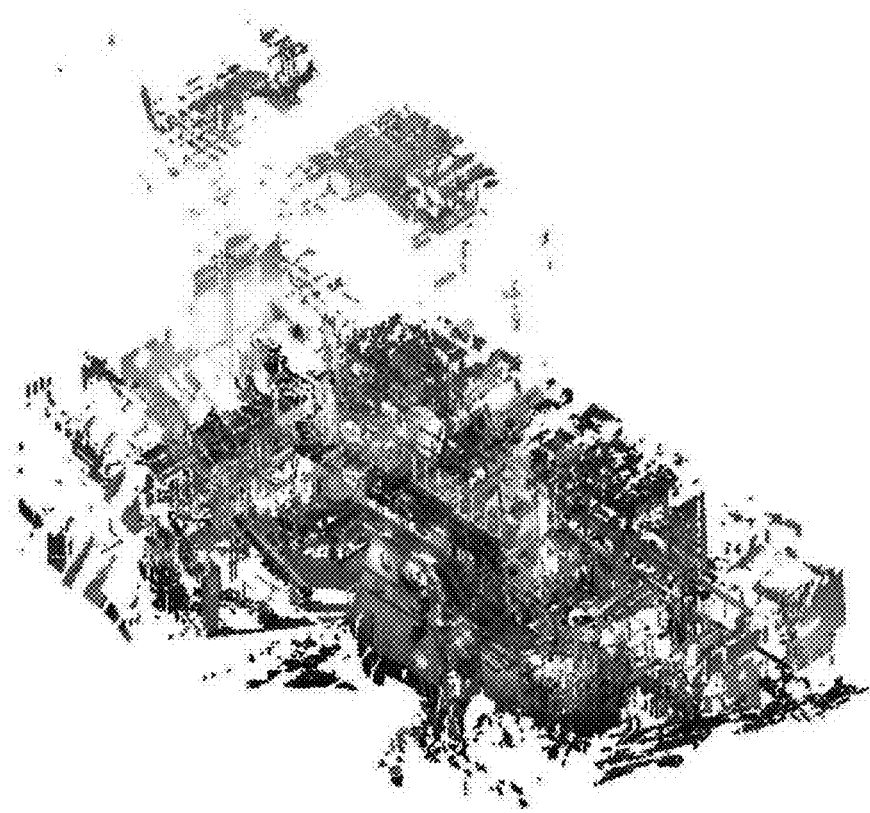
FIG. 2 is a view showing a scanned point cloud. to FIG. 3 is a view for explaining noise removal.

Thereafter, the scanned point clouds are merged (S2). FIG. 2 is a view showing a scanned point cloud. It can be seen from the figure that a simplified 3D model can be achieved by merge of plural points the above-mentioned characteristics of point clouds. It is possible to reduce the complexity of calculation in the subsequent steps by merging points finer than necessary through this simplified method.

Thereafter, a noise is removed from the merged point cloud (S3). For example, a pipe installed in the ceiling in an indoor space of a ship is a space where a BWMS cannot be installed. Therefore, such noise removal causes a problem of increase in computational complexity when the space is searched with data including the pipe. Accordingly, for example, there may be a process of increasing a speed of computation by regarding and removing this data as a nose and a process of removing noise point data due to an error of measurement of an actual scanner.

Figure 3:
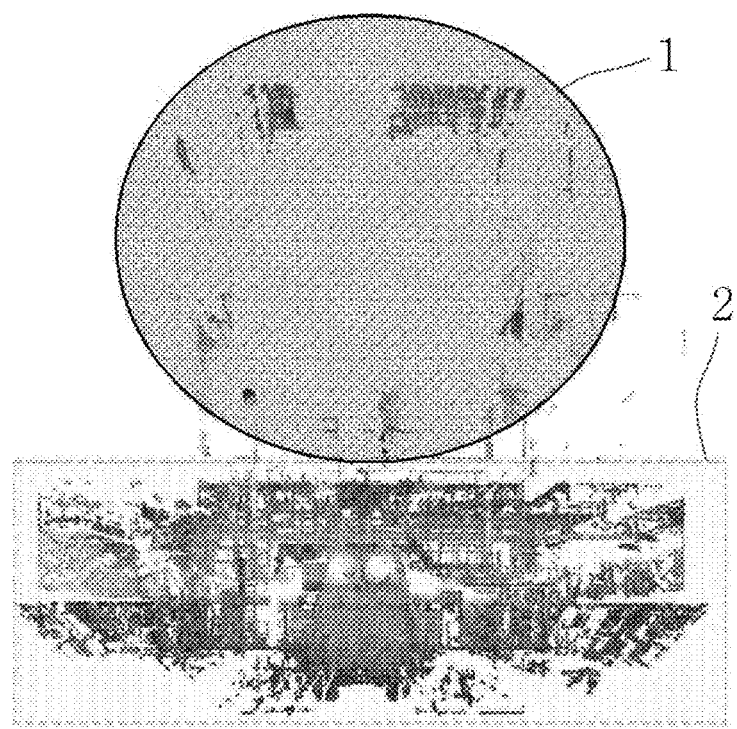

FIG. 3 is a view for explaining the noise removal. Referring to FIG. 3, a space where a BWMS can be installed in a floor is used as an area of interest 2 in a point cloud and a space of the ceiling is removed as an area of non-interest 1. For reference, FIG. 3 shows a point cloud observed from the side.

In the above description, the step S2 of merging point clouds and the step S3 of removing a noise from the point clouds may be applied differently. For example, after a noise is removed from point clouds scanned at different particular positions, the point clouds with no noise may be merged. As another example, a noise may be removed to suppress the increase in computation complexity although the noise may be not removed.

The merged point clouds with no noise are used to explore a space where a BWMS can be installed. It is known that the BWMS has a certain volume as the dimension of horizontal/vertical/height (X1/Y1/Z1). Therefore, a space where a cuboidal BWMS can be installed can be explored. Hereinafter, the process of exploring a space where a BWMS can be installed will be described in more detail. First, obstacle data provided as a setting height is created (S4). Here, the obstacle data may be created as 2D data. The creation of the obstacle data may be performed by assuming that the BWMS can be installed at a certain height (Z2) from the floor of an indoor space, superimposing point clouds located at a height (Z3=Z1+Z2) which is an addition of the BWMS height (Z1) and the height (Z2), and indicating the superimposed point cloud as 2D data. In other words, on the assumption that the BWMS is installed at a certain height from the floor, the presence of established equipment in a space where the BWMS is expected to be installed is indicated in a 2D manner. Accordingly, all point clouds lying within a certain interval (Z2-Z3) can be indicated in the 2D obstacle data. Through this procedure, it can be determined whether or not the BWMS interferes with the established equipment in the indoor space. For example, if no point cloud is included in the obstacle data and a 2D rectangle which can be drawn has the area of (X1, Y1), the BWMS can be placed in the area.

Assuming that the floor is zero, the certain height (Z2) at which the BWMS is installed may be given with a certain value higher than zero. This is to obtain a margin of BWMS installation because the floor is highly likely to be a passage.

Figure 4:
FIG. 4 is a view for explaining obstacle data.

FIG. 4 is a view for explaining the obstacle data. In FIG. 4, a red color represents a point cloud and a blue color represents emptiness in height.

Although the obstacle data may be created in 3D, it is preferably created in 2D since the computational complexity can be dramatically reduced and intuitiveness can be improved when a user interface is applied.

On the other hand, in a case of ship, although a BWMS can be installed in an empty space at a certain height, a passage is necessarily secured for the reason of safety, transportation and movement. To this end, a BWMS is not allowed to be installed in the passage. Accordingly, the passage has to be excluded from BWMS installation positions.

Passage data is created in order to secure the passage (S5). The passage data may be obtained by excluding a point of height at which the 3D scanner is located, from the point cloud, as will be described in detail below. The point cloud can be obtained by using 3D scanners installed at different positions, as described previously. At this time, the floor where the 3D scanners are located may be circular and the height of the floor may be indicated. In this case, the floor is highly likely to be a passage. Of course, an area that a laser beam cannot reach may be indicated in a shape different form a circle. However, this region is highly likely to appear as a circular hall 5 depending on the type of irradiation of the laser beam.

In the merged point clouds, a point cloud having the same height as the height of a point immediately adjacent to the hall 5 may be passage data. The passage data can be all indicated by mapping all point clouds having a certain height interval onto one 2D plane. This includes a case where a small difference in height with the passage may be handled as substantially the same height as the passage. To this end, the small height difference may be several centimeters in which case the difference may be regarded to be equal to the passage height.

Figure 5:
FIG. 5 is a view showing passage data.

FIG. 5 is a view showing the passage data. Referring to FIG. 5, all passage data are indicated in red with respect to the hall 5.

Thereafter, the passage data and the obstacle data are merged to provide the merged data (S6).

Figure 6:
FIG. 6 is a view showing merged data.

FIG. 6 is a view showing the merged data. Referring to FIG. 6, a red point in the obstacle data and a red point in the passage data are points where a BWMS is difficult to be installed. The merged data are divided into red and blue. This mapped 2D point data can be made in a grid to divide a space. Explaining how to define the grid, first, the horizontal length and vertical length of the mapped 2D point data are intelligently recognized by the system. Then, a shorter length is taken and divided by a value input by a user to set a grid interval. At this time, a smaller value input by the user provides a higher resolution of the 2D point data, thereby providing increased accuracy when a space is searched. The point data is set to a digit "0" or "1" depending on the presence or not of point data in a section generated thus. That is, the point data can be indicated by a binary. For example, point data in a red area is set to "1" which means that a BWMS is not allowed to be installed. A blue area is an area where no point data is present and a BWMS is allowed to be installed.

Thereafter, an installation space of BWMS is explored (S7). In more detail, the merged data is explored to find an area where a BWMS of a size of horizontal/vertical (X1/Y1) is allowed to be installed, from blue areas, i.e., areas where no point data is present and then the found area may be taken as an installation space of BWMS. At this time, a maximum rectangle method may be used to fine the widest area from the blue areas and then the found widest area may be determined as an installation space of BWMS.

Finally, an area defined as an installation space of BWMS can be indicated in 3D in the point clouds (S8). This may be performed by indicating an installation space in a CAD (Computer Aided Design) system. In the step (S7) of exploring the BWMS installation space, the installation is defined in 2D. Accordingly, the BWMS installation can be indicated in 3D on the point clouds by using the horizontal/vertical information (x, y) of the installation space obtained in the step (S7) of exploring the BWMS installation space and the height (Z2) of the floor where the BWMS set in the step (S4) of creating the obstacle data is to be installed. In this step, it can be again verified whether or not the BWMS is allowed to be installed.

Figure 7:
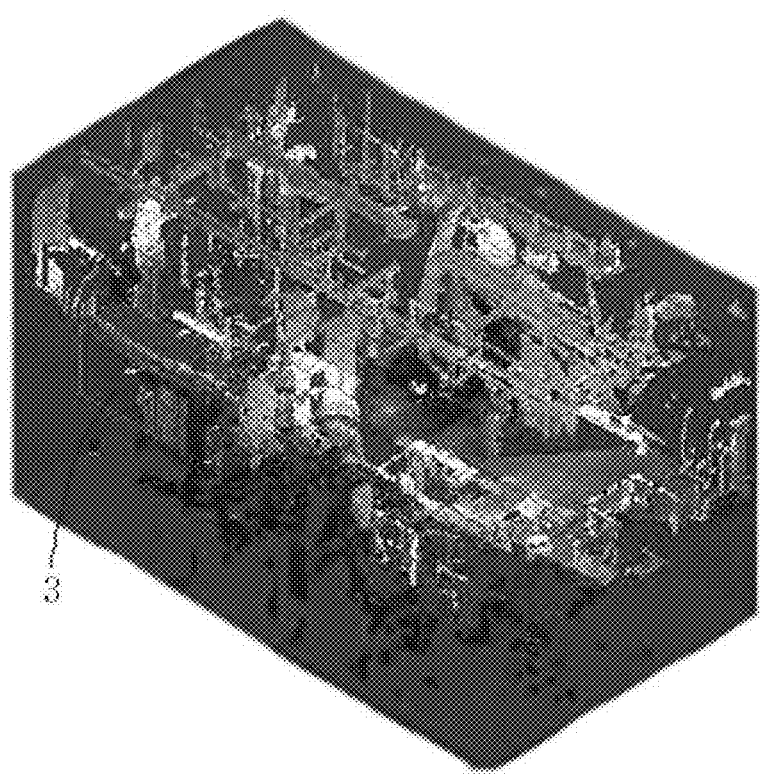
FIG. 7 is a view showing a 3D modeling.

FIG. 7 is a view showing a 3D modeling in which an installation space 3 is indicated.

According to the above-described method for exploring an installation space of an article, only if the standard of BWMS is provided, it is possible to automatically find an installation space of BWMS from point clouds acquired using a 2D scanner. According to the embodiment of the present invention, it is possible to shorten BWMS installation from one week or more required for conventional techniques to one day, thereby eliminating a waste of time and preventing reduction in a profit from the operation of a ship.

The above-described method for exploring an installation space of an article can be coded in the form of a program which is installed in a computer and can receive point data and provide an installation space of BWMS through appropriate calculation. This work can be entirely automated to dramatically lessen a labor of a worker.

<Second Embodiment>

A second embodiment involves a method for acquiring more correct passage data than that acquired in the first embodiment. For example, if established equipment wastefully occupies a large area, this area may be excluded as a space where a BWMS is not allowed to be installed although the area is not a passage, which wastes useful space resources. The second embodiment suggests a method for exploring an installation space of an article, which is capable of solving this problem. However, the second embodiment cites many portions of the first embodiment. Therefore, the same description in the first embodiment is applied to the same portions of the second embodiment and characteristics of the second embodiment will be described.

An indoor space in a ship is partitioned in such a way that a passage is painted in blue, an area where equipment is placed, etc. Therefore, such color information included in a point cloud acquired by a 3D scanner can be utilized to acquire more correct passage data. Such more correct passage data can act to obtain more candidate installation of BWMS.

Figure 8:
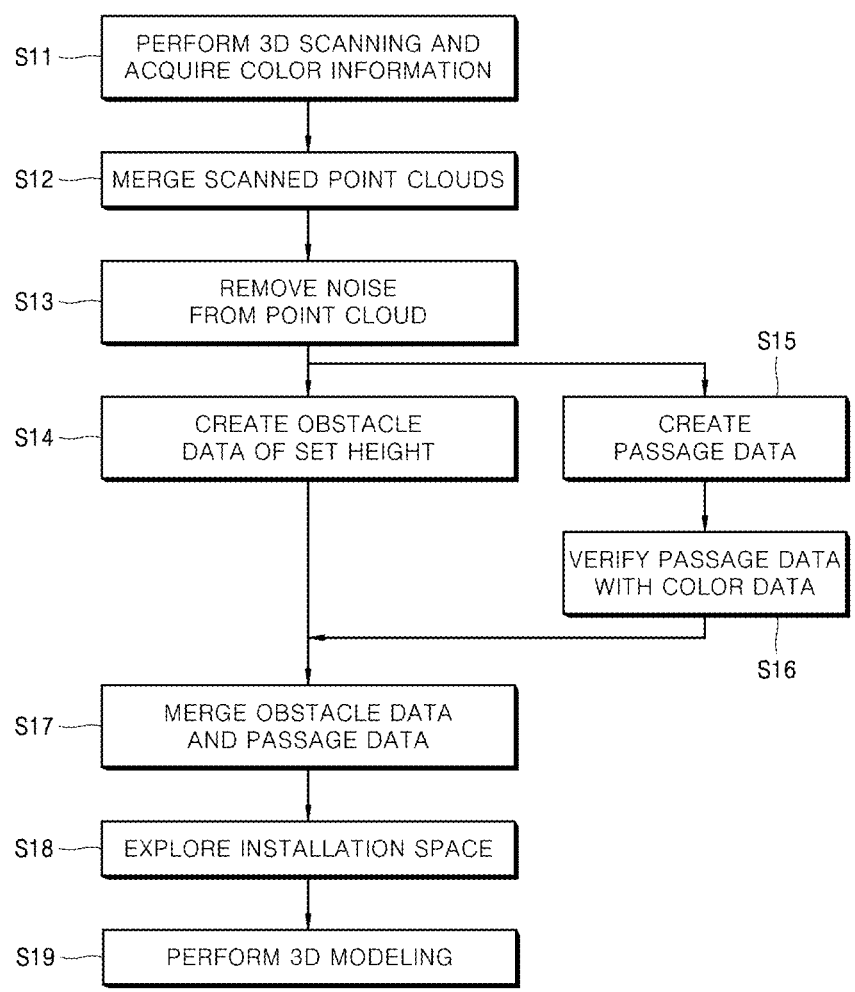
FIG. 8 is a flow chart for explaining a method for exploring a space where an article is to be installed, according to a second embodiment.

FIG. 8 is a flow chart for explaining the method for exploring a space where an article is to be installed, according to the second embodiment.

Referring to FIG. 8, 3D scanning is performed for an internal space, at which time color information is also acquired (S11). The color information can be acquired through a process of acquiring an image at a position of the 3D scanner in interlock with the scanning direction of the 3D scanner and combining the image and the position information together. After this, a point cloud can carry not only the position information but also the color information. Of course, the color information acquiring method and the combination of the color information and the position information may be performed in different ways.

Thereafter, a point cloud merging step (S12), a noise removing step (S13), an obstacle data creating step (S14) and a passage data creating step (S15) may be performed through the same process as the first embodiment.

The second embodiment is characterized in that the passage data further passes through a step (S16) of verifying the passage data with color data after the passage data creating step (S15). The color data may be obtained by analyzing the color information of each point data included in the point cloud. Here, the color information of the point data may be indicated by three colors of RGB and the color data may be a set of RGB information of the point data.

The color data of each point data may be analyzed by the following method. The color information of point data at a point (point 1) which is adjacent to the hall 5 and can be determined as a passage is indicated by a format of RGB (R1, G1, B1) and the color information of point data of a point (point 2) which is determined as a passage in the passage data is indicated by a format of RGB (R2, G2, B2). For example, if a Euclidean distance ($\sqrt{(R1-R2)^2+(G1-G2)^2+(B1-B2)^2}$) of the color information of the point land point 2 is within a predetermined range, the points may be determined to be a passage. On the contrary, if the Euclidean distance is out of the predetermined range, the points may be determined not to be a passage. A phase "a color is within the predetermined range" means that the color is within a range in which the color indicates a passage. A phase "colors are same" means that a difference between Euclidean distances of a certain level is small.

The color data may be analyzed using ways other than the Euclidean distance. In the second embodiment, it can be clearly understood that it can be verified whether or not a point is a passage by comparing differences between the color information of point data which can be determined to be a passage and the color information of point data to be verified.

Through the passage data verification according to the above-described process, proper correction can be made for a case where a passage is determined to be a non-passage and vice versa. Accordingly, it is possible to secure a more correct space as a space where a BWMS is allowed to be installed.

Thereafter, an obstacle data and passage data merging step (S17), an installation space exploring step (S18) and a 3D modeling step (S19) may be performed through the same process as the first embodiment.

Other embodiments will be described below.

Although it has been illustrated in the above embodiment that the color data is used to verify the passage data, if the color data is definite (for example, in a case where a specified color is definitely given to only a passage in a particular ship), a passage may be determined by the color data and may be verified with passage data acquired using a height. In some cases, only the color data may be used to determine a passage, in which case the passage can be found by discriminating differences between colors based on the color information of point data determined as the passage.

According to the present invention, it is possible to quickly install an article, particularly, a BWMS and dramatically shorten an installation time of an additional article. Thus, since costs can be saved and an overall article operation time can be lengthened to promote a profit, the present invention can be applied to a variety of industrial fields.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A method for exploring an installation space of a Ballast Water Management System (BWMS) for a ship, the method comprising:
   acquiring a point cloud of an indoor space of the ship including a number of point cloud data including color information by scanning the indoor space with a three-dimensional scanner;
   superimposing some of the three-dimensionally scanned point cloud data at a predetermined interval upward from a floor of the indoor space with point data in a two-dimensional plane to acquire obstacle data;
   acquiring passage data from the remaining point cloud data except for the superimposed point cloud data in the two-dimensional plane at the predetermined interval upward from the floor of the indoor space among the three-dimensionally scanned point cloud data;
   verifying the passage data with color data obtained by analyzing the color information of each point cloud data included in the point cloud; and
   exploring an installation space for the BWMS defined by the obstacle data and the passage data,
   wherein the installation space of the BWMS is explored at once in merged data which is obtained by merging the obstacle data and the passage data,
   the passage data is verified by determining an Euclidean distance between a first point cloud data in the passage data and a second point cloud data of the color information, and including the second point cloud data as the passage data if the Euclidean distance is within a predetermined range.

2. The method according to claim 1, wherein the obstacle data is two-dimensional data acquired by collecting point data of the predetermined interval upward from the floor of the indoor space as two-dimensional data with a two-dimensional scanner.

3. The method according to claim 2, wherein the obstacle data is acquired by collecting point data of more than a predetermined height from the floor.

4. The method according to claim 1, wherein the obstacle data and the passage data are distinguished from each other by a binary.

5. The method according to claim 1, wherein the explored installation space of the BWMS is three-dimensionally modeled in the point cloud.

6. The method according to claim 1, wherein the passage data is two-dimensional data acquired by collecting point data of same or similar height as a floor as two-dimensional data.

7. The method according to claim 6, wherein the floor corresponds to a height value of point data adjacent to a hall at which a three-dimensional scanner is located.

8. A non-transitory computer-readable recording medium having a program for exploring an installation space of a Ballast Water Management System (BWMS) for a ship stored thereon that, when executed by a processor, cause an apparatus to: acquire a point cloud of an indoor space of the ship including a number of point cloud data including color information by scanning the indoor space with a three-dimensional scanner;
   superimpose some of the three-dimensionally scanned point cloud data at a predetermined interval upward from a floor of the indoor space with point data in a two-dimensional plane to acquire obstacle data;
   acquire passage data from the remaining point cloud data except for the superimposed point cloud data in the two-dimensional plane at the predetermined interval upward from the floor of the indoor space among the three-dimensionally scanned point cloud data;
   verify the passage data with color data obtained by analyzing the color information of each point cloud data included in the point cloud; and
   explore an installation space for the BWMS defined by the obstacle data and the passage data,
   wherein the installation space of the BWMS is explored at once in merged data which is obtained by merging the obstacle data and the passage data,
   the passage data is verified by determining an Euclidean distance between a first point cloud data in the passage data and a second point cloud data of the color information, and including the second point cloud data as the passage data if the Euclidean distance is within a predetermined range.

9. A method for exploring an installation space of a Ballast Water Management System (BWMS) for a ship, the method comprising:
   acquiring a point cloud of an indoor space of the ship including a number of point cloud data including color information by scanning the indoor space with a three-dimensional scanner;

superimposing the three-dimensionally scanned point cloud data in a two-dimensional plane at a predetermined interval upward from a floor of the indoor space to acquire obstacle data;

acquiring passage data by collecting two-dimensional point data at a same or estimated height of a floor with a two-dimensional scanner;

verifying the passage data with color data obtained by analyzing the color information of each point cloud data included in the point cloud; and exploring an installation space for the BWMS defined by the obstacle data and the passage data, wherein the installation space of the BWMS is explored at once in merged data which is obtained by merging the obstacle data and the passage data, the passage data is verified by determining an Euclidean distance between a first point cloud data in the passage data and a second point cloud data of the color information, and including the second point cloud data as the passage data if the Euclidean distance is within a predetermined range.

* * * * *